(12) United States Patent
Mentzer

(10) Patent No.: US 11,381,785 B2
(45) Date of Patent: Jul. 5, 2022

(54) SYSTEM AND METHOD FOR VISUAL CONFIRMATION OF PLANTER PERFORMANCE

(71) Applicant: Deere & Company, Moline, IL (US)

(72) Inventor: Matthew Mentzer, Eldridge, IA (US)

(73) Assignee: DEERE & COMPANY, Moline, IL (US)

( * ) Notice: Subject to any disclaimer, the term of this patent is extended or adjusted under 35 U.S.C. 154(b) by 106 days.

(21) Appl. No.: 16/280,814

(22) Filed: Feb. 20, 2019

(65) Prior Publication Data

US 2020/0267355 A1 Aug. 20, 2020

(51) Int. Cl.
*H04N 7/18* (2006.01)
*A01C 7/04* (2006.01)
(Continued)

(52) U.S. Cl.
CPC .............. *H04N 7/188* (2013.01); *A01C 7/04* (2013.01); *G01B 11/14* (2013.01); *G01B 11/22* (2013.01);
(Continued)

(58) Field of Classification Search
CPC .... H04N 7/188; H04N 5/2253; H04N 5/2354; H04N 7/18; H04N 7/00; H04N 5/2251; H04N 5/225; H04N 5/222; H04N 5/00; H04N 5/235; A01C 5/064; A01C 5/068; A01C 7/04; A01C 5/062; A01C 5/06; A01C 5/00; A01C 5/066; A01C 7/00; G01B 11/14; G01B 11/22; G01B 11/00; G06T 7/0004; G06T 2207/30188; G06T 7/0002;
(Continued)

(56) References Cited

U.S. PATENT DOCUMENTS

| 5,956,255 A | 9/1999 | Flamme |
| 9,030,549 B2 | 5/2015 | Redden |

(Continued)

FOREIGN PATENT DOCUMENTS

| CN | 107278434 A | 10/2017 |
| CN | 107750550 A | 3/2018 |

(Continued)

OTHER PUBLICATIONS

Extended European Search Report issued in European Patent Application No. 20157662.6 dated Jul. 7, 2020, in 8 pages.

*Primary Examiner* — Christopher J. Novosad
(74) *Attorney, Agent, or Firm* — Michael Best & Friedrich LLP

(57) ABSTRACT

Systems and methods for automatically capturing visual data of a seed placed by a seed planting machine (e.g., a crop row planter). An electronic controller is configured to receive a signal indicative of a seed being dispensed by the seed planting machine and to trigger a camera to capture an image of the dispensed seed in response to a determination, based on the signal, that the seed has been dispensed by the seed planting machine. In some implementations, the system includes a seed sensor configured to detect a seed moving through a seed tube that dispensed seeds from the seed planting machine. In other implementations, the system is configured to detect a new seed being dispensed by the seed planting machine by analyzing image data captured by a camera.

15 Claims, 5 Drawing Sheets

(51) Int. Cl.
  *G01B 11/14* (2006.01)
  *G01B 11/22* (2006.01)
  *G06T 7/00* (2017.01)
  *H04N 5/225* (2006.01)
  *H04N 5/235* (2006.01)
  *A01C 5/06* (2006.01)

(52) U.S. Cl.
  CPC ......... *G06T 7/0004* (2013.01); *H04N 5/2253* (2013.01); *H04N 5/2354* (2013.01); *A01C 5/064* (2013.01); *A01C 5/068* (2013.01); *G06T 2207/30188* (2013.01)

(58) Field of Classification Search
  CPC ............. G06T 7/00; G06T 2207/30181; G06T 2207/30; G06T 2207/00
  See application file for complete search history.

(56) References Cited

U.S. PATENT DOCUMENTS

| | | | |
|---|---|---|---|
| 9,226,442 | B2 | 1/2016 | Grimm et al. |
| 9,779,330 | B2 | 10/2017 | Wellington et al. |
| 10,172,285 | B2 | 1/2019 | Sierra et al. |
| 10,561,059 | B2 | 2/2020 | Levy et al. |
| 10,681,861 | B2 | 6/2020 | Morgan et al. |
| 10,681,862 | B2 | 6/2020 | Stoller et al. |
| 2004/0231575 | A1 | 11/2004 | Wilkerson et al. |
| 2007/0266917 | A1 | 11/2007 | Riewerts et al. |
| 2011/0098851 | A1 | 4/2011 | Glendenning et al. |
| 2013/0128257 | A1* | 5/2013 | Stettner ................. G01S 7/4818 356/4.01 |
| 2016/0029547 | A1 | 2/2016 | Casper et al. |
| 2016/0057923 | A1 | 3/2016 | Sauder et al. |
| 2016/0345847 | A1 | 12/2016 | Gu et al. |
| 2016/0361949 | A1 | 12/2016 | Cavender-Bares et al. |
| 2017/0049044 | A1 | 2/2017 | Stoller et al. |
| 2018/0114305 | A1 | 4/2018 | Strnad et al. |
| 2018/0125002 | A1 | 5/2018 | Stoller et al. |
| 2019/0232313 | A1* | 8/2019 | Grimm .................. A01C 7/105 |
| 2019/0313575 | A1 | 10/2019 | Stoller et al. |
| 2019/0320579 | A1 | 10/2019 | Stoller et al. |
| 2020/0296885 | A1 | 9/2020 | Stoller et al. |
| 2020/0352086 | A1 | 11/2020 | Stoller et al. |
| 2020/0375090 | A1 | 12/2020 | Morgan et al. |
| 2020/0390026 | A1 | 12/2020 | Walter et al. |

FOREIGN PATENT DOCUMENTS

| | | |
|---|---|---|
| DE | 102015103379 A1 | 9/2016 |
| EP | 2080430 A1 | 7/2009 |
| EP | 2949194 | 12/2015 |
| WO | WO 2016/205422 | 12/2016 |
| WO | 2017030903 A1 | 2/2017 |
| WO | 2017097292 A1 | 6/2017 |
| WO | 2017197274 A1 | 11/2017 |
| WO | 2018013858 A1 | 1/2018 |
| WO | 2018013860 A2 | 1/2018 |

\* cited by examiner

SYSTEM AND METHOD FOR VISUAL CONFIRMATION OF PLANTER PERFORMANCE

BACKGROUND

The present invention relates to systems and methods for operating machines for planting seeds—for example, a crop row planter configured to plant seeds in a row along a field surface. More specifically, the present invention relates to system and methods for monitoring and evaluating the performance of machines that plant seeds

SUMMARY

In one embodiment, the invention provides a system for automatically capturing visual data of a seed placed by a seed planting machine (e.g., a crop row planter). An electronic controller is configured to receive a signal indicative of a seed being dispensed by the seed planting machine and to trigger a camera to capture an image of the dispensed seed in response to a determination, based on the signal, that the seed has been dispensed by the seed planting machine. In some implementations, the system includes a seed sensor configured to detect a seed moving through a seed tube that dispensed seeds from the seed planting machine. In other implementations, the system is configured to detect a new seed being dispensed by the seed planting machine by analyzing image data captured by a camera.

In some implementations where the system is configured to detect a new seed by analyzing captured image data, the system is configured to capture a sequence of images and to analyze each image to determine whether a new seed is present in the image. When the controller determines that a new seed is present in an image of the sequence of images, it triggers the camera to capture an image of the dispensed seed. In some such implementations, the image captured by the camera in response to the trigger is of a higher resolution than the images of the sequence of images. Similarly, in some implementations, a flash light source is configured to illuminate the field of view of the camera in response to detecting an image in the sequence of images that includes a new seed. Accordingly, the field of view is illuminated by the flash light source when a camera image is captured in response to the trigger, but the field of view is not illuminated by the flash light source while the camera captures the other sequence of images.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
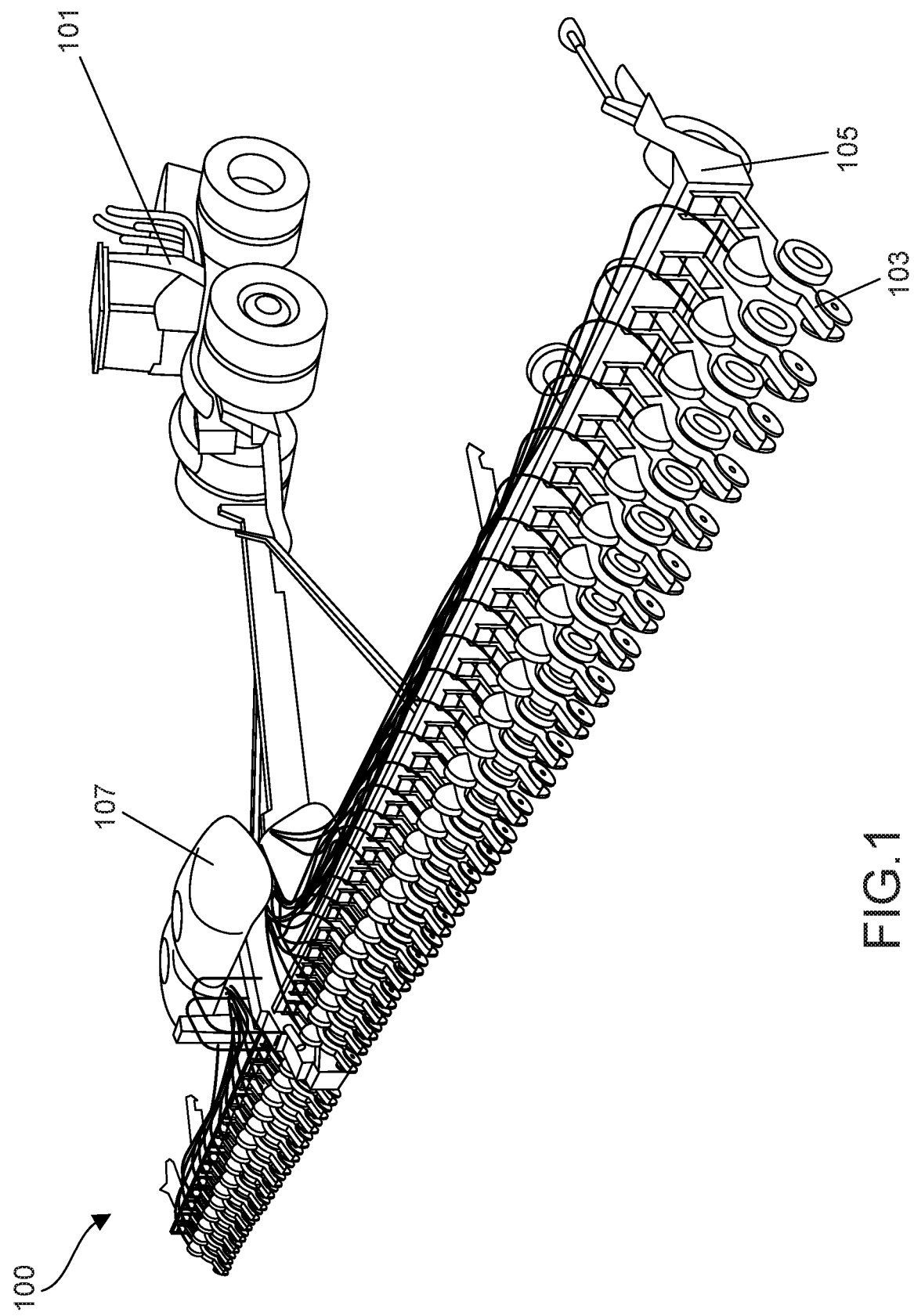
FIG. 1 is a perspective view of a row crop planter according to one embodiment.

FIG. 1 illustrate an example of a row crop planter 100 that is pulled by a tractor 101 during operation. The row crop planter 100 includes a plurality of row seeders 103 arranged in parallel along a support bar 105 and one or more seed storage vessels 107. Although the example of FIG. 1 shows a single seed storage vessel 107, in other implementations, each row seeder 103 includes a separate seed storage vessel 107. As the row crop planter is pulled across a field surface, each row seeder 103 opens a trench (or furrow), deposits a seed from the seed storage vessel 107 into the trench, and, in some cases, closes the trench. As a result, the operation of the row crop planter 100 produces a series of generally parallel trenches that are each seeded with multiple seeds along the length of the trench.

Figure 2:
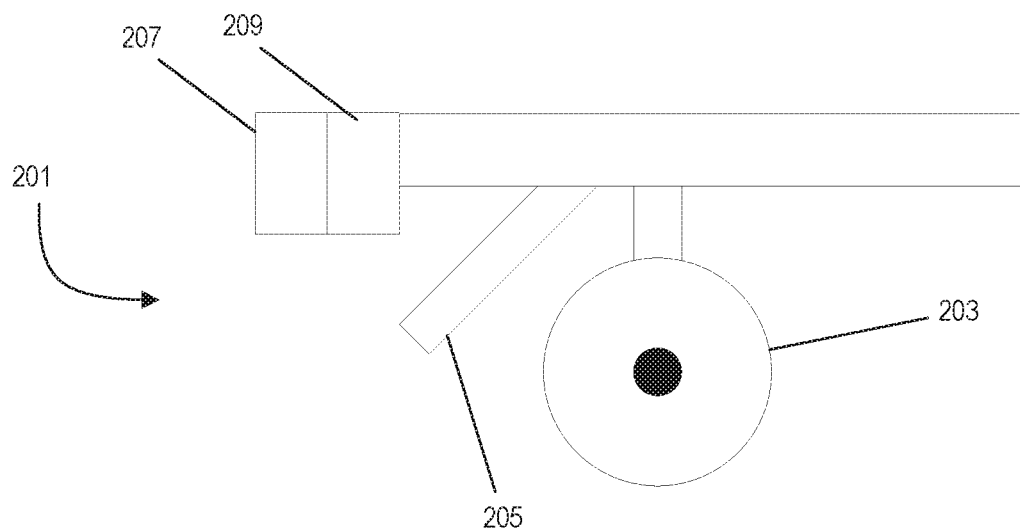
FIG. 2 is a schematic diagram of an example of a row seeder with an opening disc for use in the row crop planter of FIG. 1.

FIG. 2 illustrates one example of a row seeder 201 that might be used as a row seeder 103 of the row crop planter 100 of FIG. 1. The row seeder 201 includes one or more "opening discs" 203 configured to open/dig a trench as the row seeder 201 is pulled along the field surface. A seed tube 205 is positioned and configured to deposit seeds from the seed storage vessel 107 into the trench after the trench is opened by the opening disc 203. In some implementations, the row seeder 201 is configured to dispense individual seeds through the seed tube 205, one-at-a time, at locations along the trench. In some implementations, the row seeder 201 is further equipped with a seed sensor (e.g., incorporated into the seed tube 205). The seed sensor may be configured to detect when an individual seed passes through the seed tube 205 or, in some implementations, to measure the speed/rate at which seeds move through the seed tube 205.

For example, the seed sensor may include a light beam emitter and a light sensor positioned in a counter-facing arrangement on either side of the seed tube 205 so that, when no seed is present in the seed tube, a light beam emitted by the light beam emitter is received & detected by the light sensor. When a seed passes through the seed tube, the light beam is obstructed and, in response to the temporary absence of a light beam detected by the light sensor, the seed sensor generates a signal indicating that a seed has passed through the seed tube 205. Although the example of FIG. 2 includes a seed tube 205 and a seed sensor configured to detect a seed in the seed tube, in some other implementations, the seed planting machine 100 and/or the individual row seeder 201 does not include a "seed tube" and may instead include another type of "trench delivery system" (e.g., a brush belt) configured to deliver the seed from the planter into the trench. In some implementations that do not utilize a "seed tube," the seed sensor may be configured to detect the presence of a seed moving through another part of the seed planting machine (e.g., through the trench delivery system) that is about to be dispensed by the seed planting machine 100.

In the example of FIG. 2, the row seeder 201 also includes a camera 207 and a "flash" light source 209. The camera 207 is positioned with a field of view including at least a portion of the trench where the seed with be deposited and, as discussed in further detail below, is configured to capture visual evidence of one or more seeds deposited in the trench and, in some cases, additional information about the trench and/or the placement of the seeds therein. The flash light source 209 is configured to provide a high-intensity, short-duration burst of light that will illuminate the trench while an image is captured by the camera 207.

Figure 3:
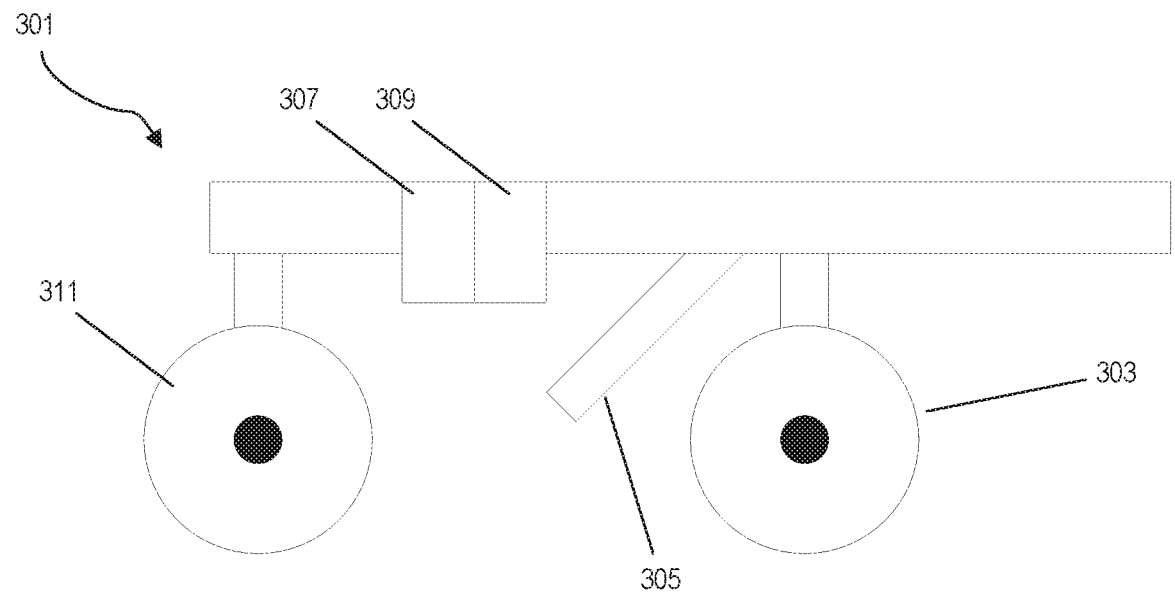
FIG. 3 is a schematic diagram of another example of a row seeder with an opening disc and a closing wheel for use in the row crop planter of FIG. 1.

FIG. 3 illustrates another example of a row seeder 301 that might be incorporated into the row crop planter 100 of FIG. 1. Like in the example of FIG. 2, the row seeder 301 includes one or more opening discs 303 and a seed tube 305 that, in some implementations, may be equipped with a seed sensor as discussed above in reference to FIG. 2. The row seeder 301 also includes a camera 307 and a flash light source 309 configured to capture images of seeds in the trench and to illuminate the trench, respectively. However, unlike the example of FIG. 2, the row seeder 301 also includes a closing wheel 311 that is configured to close the trench to cover the seeds deposited therein. Accordingly, the camera 307 is positioned to capture an image of the trench after the trench has been opened by the opening disc 303 and before the trench is closed (and the seeds covered) by the closing wheel 311.

Figure 4:
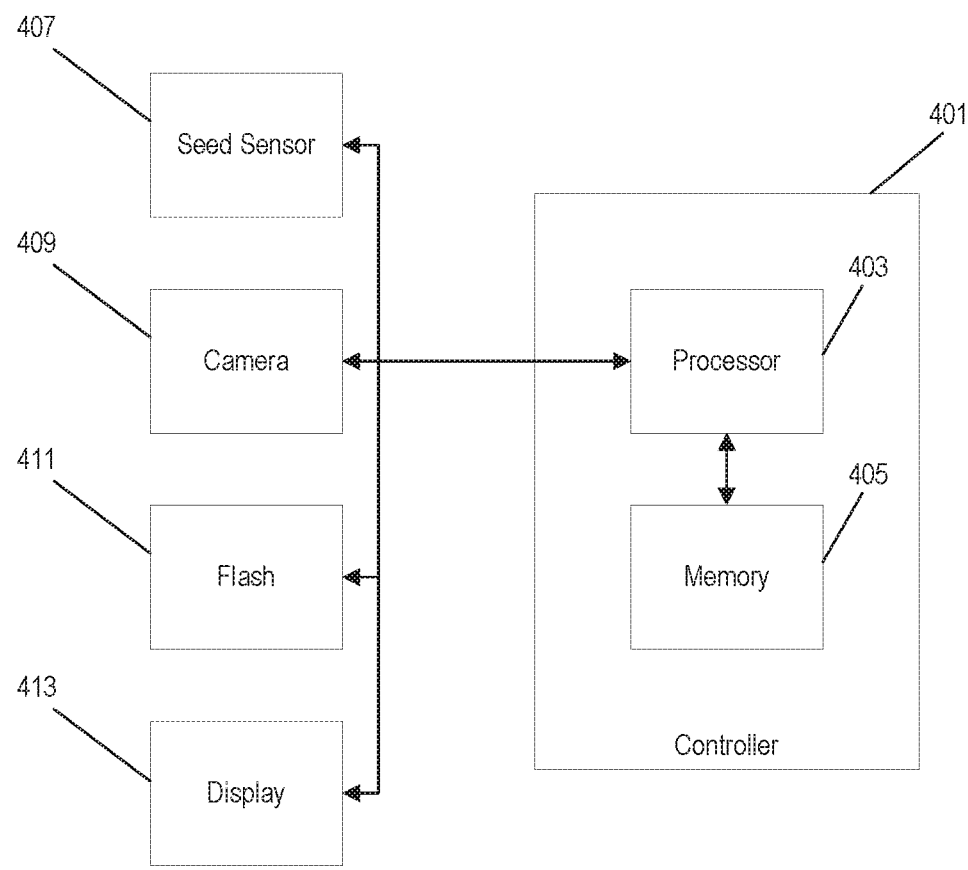
FIG. 4 is a block diagram of a control system for visual confirmation of seeds planted by the row crop planter of FIG. 1.

FIG. 4 illustrates an example of a system configured to capture visual evidence and data of seeds deposited in a trench by a row seeder (e.g., row seeder 103 of FIG. 1, row seeder 201 of FIG. 2, or row seeder 301 of FIG. 3). A controller 401 includes an electronic processor 403 and a non-transitory, computer-readable memory 405. The memory 405 is communicatively coupled to the processor 403 and is configured to store data and instructions that, when executed by the processor 403, cause the controller 401 to perform functionality such as described herein. The controller 401 is also communicatively coupled to a seed sensor 407, a camera 409, a flash light source 411, and a graphical display screen 413. As discussed above, the seed sensor 407 provides a signal to the controller 401 indicating when a seed passes through a seed tube. In some implementations, the seed sensor 407 is directly coupled to the controller 401 while, in other implementations, one or more seed sensors 407 might be coupled to another intermediate controller (not pictured) that receives data from the seed sensor 407 and communicates to the controller 401. The controller 401 is configured to control the operation of the camera 409 and to receive image data captured by the camera 409. The controller 401 is also configured to transmit a signal to the flash light source 411 that controllably triggers the high-intensity, short-duration burst of light emitted by the flash light source 411. Finally, the controller 401 is configured to transmit image data that is shown on the graphical display screen 413.

In some implementations, the controller 401 is configured to cause the camera 409 to capture one or more images of seeds deposited in the trench by a row seeder. Images captured by the camera 409 in this way may be stored to memory as evidence confirming that seeds have been deposited in the trench. The stored image data can then be analyzed later in order to evaluate the manner and quality of seeding provided by the row crop planter 100. This information can, in turn, be used to evaluate and adjust settings of the row crop planter 100 and to evaluate the performance of the operator of the row crop planter 100. Additionally, in some implementations, image data captured by the camera 409 can be processed and/or displayed to the operator in real-time (or near-real-time, or "on-demand") to monitor and evaluate the planting process while planting is underway. This information might be used by the operator, for example, to make adjustments to improve the planting operation or to detect system failures before completing the planting process. Furthermore, in some implementations, the controller 401 is configured to automatically adjust one or more operating settings of the row crop planter (e.g., a cutting depth of the "opening disc," a speed at which seeds are ejected through the seed tube, or the speed over the tractor pulling the row crop planter 100) in response to an analysis of the images captured by the camera 409.

Figure 5:
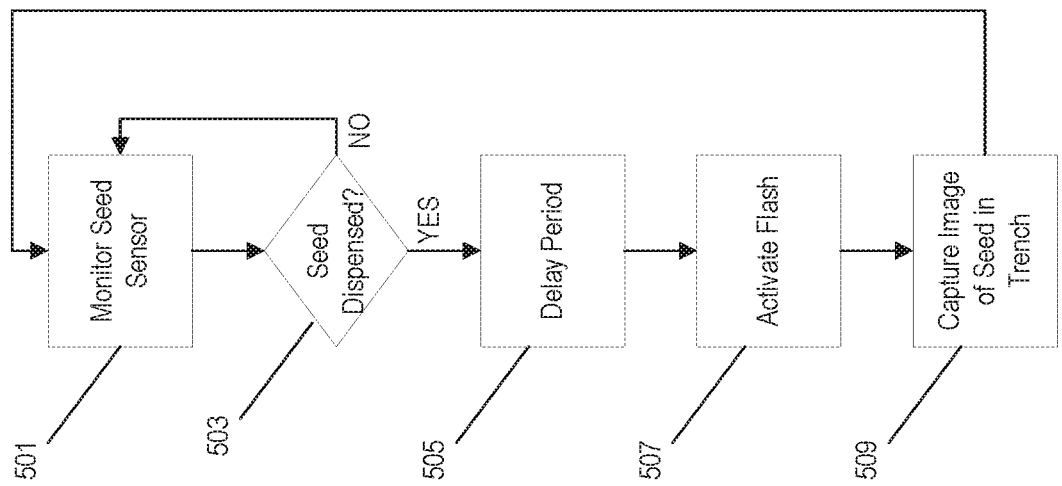
FIG. 5 is a flowchart of a method of capturing visual information of seed planting triggered by a seed sensor using the system of FIG. 3.

FIG. 5 is an example of a method in which the controller 401 facilitates the capturing of images by the camera 409. The controller 401 monitors the output of the seed sensor 407 (step 501). When the signal from the seed sensor 407 indicates that a seed has moved through the seed tube (step 503), the controller 401 waits for a defined delay period (step 505) to allow the seed time to move from the seed tube to the trench. The defined delay period may be calculated or determined based on various criteria relating to the system configuration including, for example, the speed of the planter 100, the height of the seed sensor 407, and the speed of the trench delivery system (i.e., the speed at which the seed is dispensed from the planter into the trench). After the conclusion of the delay period, the controller 401 sends a signal to the flash light source 411 triggering activation of the flash (step 507) and receives one or more images from the camera 409 captured while the flash illuminates the trench area (step 509). The controller 401 then waits until the seed sensor 407 again indicates that another seed is being dispensed before repeating the image capture and flash trigger process of FIG. 5.

In some implementations, the camera 409 is provided and operated as a "still" image camera configured to capture individual still images. In other implementations, the camera 409 may be provided and/or operated as a video camera and configured to capture a sequence of image frames in response to the trigger from the controller 401. Furthermore, although the example of FIG. 5 describes a "defined delay period" between detecting the seed and activating the flash, in some implementations, the delay period can be configurable or adjustable. For example, the controller 401 might be configured to adjust the delay period automatically by analyzing the captured images in order to ensure that the seed has reached an intended positions (e.g., at the bottom or the trench) and that the seed is still in the field of view of the camera when the image is captured. In other implementations, the delay period might be automatically adjusted by the controller 401 based on sensed or monitored system variables including, for example, a depth of the trench (indicated, for example, by a position of the opening disc of the row seeder or an analysis of the captured image(s)), a speed of the planter 100 (indicated, for example, by a vehicle speedometer), and a speed of the trench delivery system.

Figure 6:
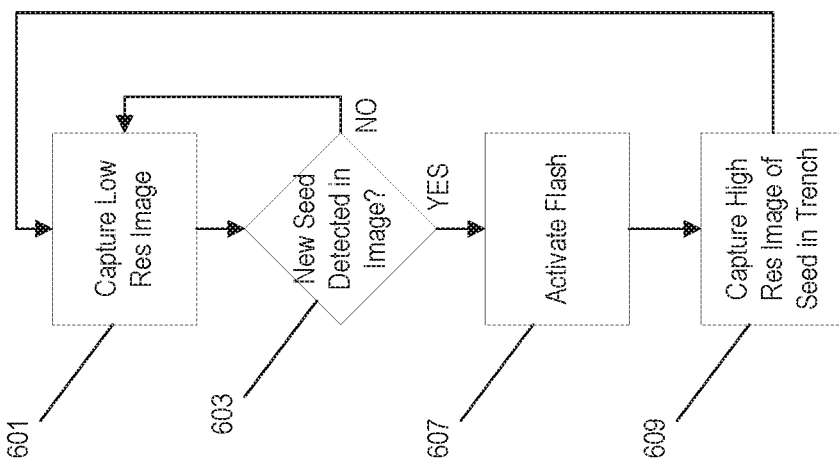
FIG. 6 is a flowchart of a method of capturing visual information of seed planting triggered by a camera using the system of FIG. 3.

Finally, although activation of the flash and the capture of the image(s) is triggered by the output of a seed sensor in the example of FIG. 5, in other implementations, the controller 401 may be configured to trigger the flash 411 and the camera 409 in response to another device or occurrence. For example, another type of sensor might be used to detect the dispensing and/or placement of a seed. In the example of FIG. 6, the operation of the flash and the camera is triggered based on processing of other images captured by the camera 409.

In the example of FIG. 6, the camera 409 is configured to continuously or periodically capture images of the trench (step 601). The images are processed by the controller 401 to detect the appearance of a seed in the trench (step 603). For example, the controller 401 might be configured to apply an edge detection image processing mechanism to determine a shape of an object in the captured image data and to then apply a shape-matching algorithm to determine whether a detected object is a seed. In other implementations, the controller 401 may be configured to apply a movement detection algorithm to detect an object entering the field of view of the camera at a speed different from the movement of the trench in the background of the image. Once the presence of a seed is detected in the captured, low-resolution image data, the controller 401 activates the flash (step 607) and operates the camera 409 to capture one or more images of the seed in the trench (step 609) while the trench is illuminated by the flash.

In some implementations, the controller 401 and the camera 409 are configured to capture images of the trench at a relatively low resolution until a seed is detected and the flash is activated and will then operate to capture images with a higher resolution while the trench is illuminated by the flash. Also, although the system of FIG. 4 and the method of FIG. 5 describe using the same camera 409 to capture images before and after the seed is detected, in some implementations, the system is configured to include two different cameras positioned with a field of view that includes the opened trench. The first camera may be configured to capture images at a relatively low resolution or to capture image data in a way better suited to tracking the movement/presence of a seed. For example, the first camera might be configured as a motion capture or thermal imaging system (if the seed are dispensed at a different temperature than the surrounding ground). In such system, a second camera may be provide and configured to capture images at a higher-resolution while the trench is illuminated by the flash. In some implementations, the controller 401 is configured to monitor the image data from the first camera until a seed is detected and to then activate the flash and capture an image using the second camera in response to detecting the presence of a seed in the trench.

Furthermore, in the example of FIG. 5, the controller 401 is configured to wait for a defined delay period before activating the flash and capturing the images (step 505). This is to allow enough time for the seed to leave the seed tube and reach an appropriate position in the trench. However, in the example of FIG. 6 where the seed is detected in the trench (and not in the seed tube), the seed may already be in an appropriate position for imaging when the seed is detected in the image data. Accordingly, a delay period may not be necessary or appropriate in some implementations using methods similar to the example of FIG. 6.

In the example of FIG. 5, the system is configured to detect that a seed is being dispensed based on a signal from a seed sensor. In the example of FIG. 6, the system is configured to detect that a seed has been dispensed by identifying the seed in a captured camera image. In still other implementations, the system may be configured to determine when to capture an image of the trench based on the controlled actuation or timing of the seed planting machine itself. For example, a system may include a controllable seed dispensing actuator that is configured to eject an individual seed in response to an actuation signal (e.g., an "eject" signal) received from the electronic controller. In some such implementations, the speed at which the seed is ejected can also be regulated by actuation signals from the controller. In other implementations, the system may be configured to automatically eject individual seeds according to a defined "timing" schedule.

In these and other implementations, the electronic controller may be configured to determine when a seed will be dispensed into the trench based on the actuation signals and/or the timing schedule for the controllable seed dispensing actuator. Accordingly, instead of receiving a signal from an external system indicative of a detected presence of the seed (e.g., an output from a seed sensor or an image of the trench captured by the camera), the system may be configured to trigger the camera to capture an image based on the actuation signal and/or timing schedule for the controllable seed dispensing actuator. For example, the electronic controller may be configured to generate an actuation signal instructing the controllable seed dispensing actuator to eject a seed, to then wait for a defined delay period to allow enough time for the ejected seed to reach the trench, and to then trigger the camera to capture an image after expiration of the delay period.

Figure 7:
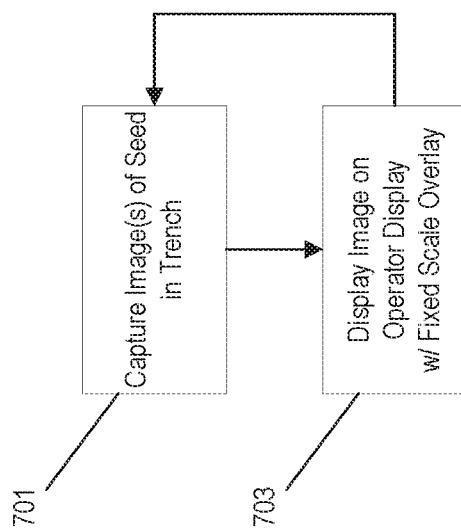
FIG. 7 is a flowchart of a method of presenting visual information of seed planting to an operator using a fixed measurement scale.

As mentioned above, once images of the seeds are captured, they can be stored to the memory 405 for later review/analysis or to establish a record of evidence of the amount and locations of seeds planted in a particular field. However, in some implementations, the system may be configured to display image data to an operator of the system during the planting process. FIG. 7 illustrates one example of a method for displaying this image data to an operator. As images are captured by the camera (step 701), they are displayed on an operator display screen (step 703). In the example of FIG. 7, these images can be displayed as raw, unedited images or (alternatively or additionally) additional data may be displayed on the screen to assist the operator in performing the planting operation. For example, because the position of the camera is fixed relative to the row crop planter, the system might be configured to superimpose a scale on the displayed image to assist the operator in determining variables that may affect the planting process including, for example, an estimated depth and/or width of the trench. Similarly, if the camera 409 is positioned at an angle relative to the trench such that multiple seeds are visible at the same time in the field of view of the camera 409, a scale may be superimposed on the output image displayed to the operator indicating a distance/spacing between adjacent seeds. In some implementations, the controller 401 might also be configured to display a sequence of captured images (either to the operator during seeding or to a user after seeding is completed) as a "flip book" to demonstrate variation in the placement (e.g., depth) of seeds planted in a particular row or variations in seed placement between different rows in a field.

Figure 8:
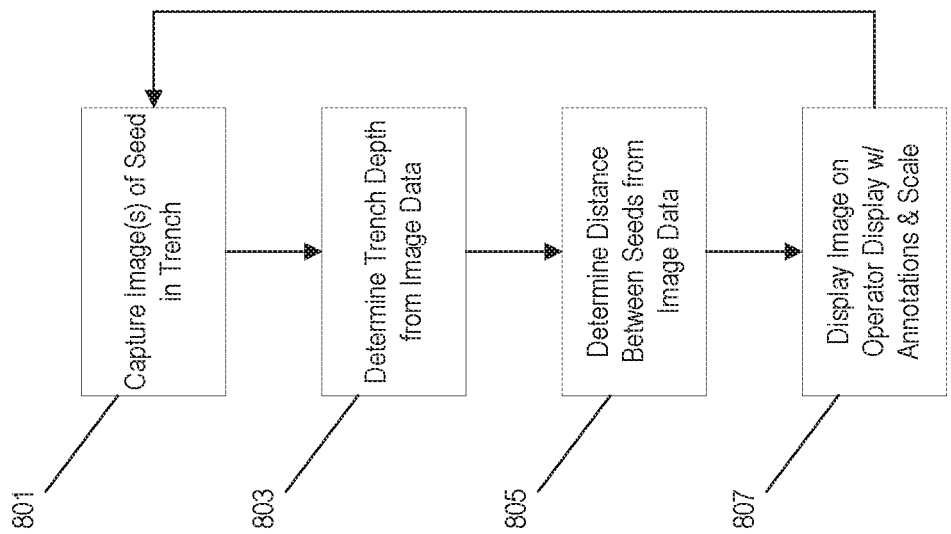
FIG. 8 is a flowchart of a method of presenting visual information of seed planting to an operator using data extracted from captured images.

In addition or instead of displaying image data with superimposed stationary "scales," in some implementations, the system may be configured to analyze captured image data to make a more specific determination of particular planting variables. For example, as illustrated in the example of FIG. 8, the system may be configured to capture images of the seed in the trench (step 801) and to then process the captured image data to calculate a depth of the trench (step 803), for example, based on a relative size of the seed in the image data when the seed is positioned at the bottom of the trench. The system may also be configured to process the captured image data to determine a distance/spacing between seeds (step 807). This might be done, for example, by comparing time-stamps associated with each captured image in reference to a measured speed of the row crop planter and/or a speed of the tractor pulling the row crop planter. In some implementations, the controller 401 might be configured to determine a speed of movement based on captured image data. This information can then be displayed in numerical and/or graphical form on the images that are shown on the display (step 807).

As discussed above, captured image data can be analyzed to determine a final position and/or variation of seed placement in the trench. However, the captured image data might also be used to determine other characteristics of seed behavior to better understand the cause of variations in seed placement. For example, the captured image data may be analyzed by the controller to determine whether the seed is impacting a sidewall of the trench as it is dispensed instead of directly impacting the bottom of the trench. Based on this analysis, the system determines whether an adjustment to the seed dispensing mechanism (e.g., the position of the seed tube) may be necessary to ensure that seeds are dispensed directly to the bottom of the trench. In some implementations, the captured image data is also analyzed to determine whether dispensed seeds move (e.g., "tumble") along the trench after they are dispensed instead of coming to rest at a location of initial impact in the trench. By detecting "tumbling" seeds, the system may be configured to determine whether an adjustment to the speed of the planter (e.g, the speed at which the tractor pulling the planter is moving) and/or the speed at which seeds are ejected from the planter are necessary to ensure appropriate and consistent seed placement. In some implementations, the system may be configured to capture a series of images each time an individual seed is dispensed so that movement of the dispensed seed can be monitored and analyzed by the system. Also, in some implementations, the system may be configured to automatically make adjustments to the operation, configuration, or position of the planter based on the analysis of the captured image data.

The examples described above in reference to FIGS. 2-8 focus primarily on an individual row seeder. However, as illustrated in the example of FIG. 1, a row crop planter 100 will include many different row seeder units positioned and operating in parallel trenches. Accordingly, in some implementations, each row seeder unit is configured to include its own camera 409 and its own flash light source 411. In other implementations, the row crop planter may be configured to include one or more cameras that are each configured and positioned with a field of view that extends across multiple different trenches. Similarly, in some implementations, each row seeder unit may be configured to include its own controller 401 while, in other implementations, a single controller 401 is configured to communicate and control multiple seed sensor, flash light sources, and/or cameras for multiple different row seeder units.

Furthermore, because some implementations are configured to capture images of individual seeds deposited in each of a plurality of different trenches. The system may be configured with various different mechanisms for displaying the captured seed image data to an operator of the system. For example, in some implementations, the system is configured to display images of seeds deposited by each row seeder unit in sequence as a "flip-book" or an "animation" to show variations in seeding. For example, a system that includes 20 row seeder units may be configured to display images in order from the first row seeder unit to the last and to then repeat the display process.

Alternatively or additionally, in some implementations, the system may be configured to detect when a seed placement (e.g., the trench depth, seed spacing, etc.) for a particular trench/row seeder unit does not meet certain prescribed criteria or exceeds a variation threshold as compared to seeds in other trenches. In such implementations, the system might be configured to automatically display images of seeds corresponding to that identified trench/row seeder unit that does not meet the prescribed criteria and may require adjustment.

As yet another display feature in addition to or instead of the display mechanisms described above, the system may be configured to provide a user interface in which the operator can select one or more specific row seeder units to monitor on the display. This may include, for example, displaying all of the camera images at the same time (e.g., in a grid layout), receiving a selection from the operator (e.g., via a touch-screen interface) of one or more particular images and subsequently displaying camera images corresponding to the images that were selected by the operator.

Finally, as discussed above, in some implementations, the system may be configured to adjust or regulate the operation of the row crop planter based on captured image data. For example, a row seeder unit, in some implementations, may be equipped with an actuator designed to controllably raise and lower the opening disc and, thereby, control the depth of the trench. The controller may be configured to determine an average seed depth in a particular trench based on the captured image data and, in response, operate the actuator to achieve/approach a target seed depth. In various implementations, the controller may be configured to adjust other actuators in addition to or instead of an opening disc height actuator in response to an analysis of the captured image data of deposited seeds. Such actuators may include, but are not limited to, opening disc angle actuators configured to adjust a width of a trench and a seed dispensing actuator configured to control the speed and/or frequency at which seeds are ejected through the seed tube.

Thus, the invention provides, among other things, systems and methods for automatically capturing visual data indicative of seeds deposited by a planting system and for providing information regarding planting quality based on the captured image data. Various features and advantages of the invention are set forth in the following claims.

What is claimed is:

1. A system for automatically capturing visual data of a seed placed by a seed planting machine, the system comprising:
   an electronic controller configured to
      receive a sequence of images each including a portion of a field surface;
      analyze the sequence of images to detect when a seed is dispensed by the seed planting machine; and
      trigger a camera to capture a seed image of the dispensed seed in response to detecting, based on the analysis of the sequence of images, that the seed has been dispensed by the seed planting machine, wherein the camera is coupled to the seed planting machine, and wherein the seed image of the dispensed seed is a higher resolution image than the images of the sequence of images.

2. The system of claim 1, wherein the seed planting machine is a crop row planter including a plurality of row seeder units, wherein each row seeder unit of the plurality of row seeder units includes at least one trench opening disc configured to open a trench in a field surface as the crop row planter moves along the field surface, and at least one trench closing wheel configured to close the trench opened by the at least one trench opening disc, wherein the row seeder unit is configured to dispense an individual seed in the trench after the trench is opened by the at least one trench opening disc and before the trench is closed by the at least one trench closing wheel, wherein the camera is coupled to the crop row planter and positioned with a field of view including a portion of the trench between the at least one trench opening disc and the at least one trench closing wheel.

3. The system of claim 1, wherein the electronic controller is configured to wait for a defined delay period after detecting, based on the analysis of the sequence of images, that the seed has been dispensed by the seed planting machine before triggering the camera to capture the seed image of the dispensed seed, wherein the defined delay period is defined to allow the seed enough time to exit the seed planting machine and land on the field surface in the field of view of the camera, wherein the camera is coupled to seed planting machine with a field of view that is fixed relative to the seed planting machine.

4. The system of claim 1, further comprising a flash light source configured to illuminate a field of view of the camera, wherein the electronic controller is further configured to activate the flash light source in response to detecting, based on the analysis of the sequence of images, that the seed has been dispensed by the seed planting machine, and wherein the electronic controller is configured to trigger the camera to capture the seed image of the dispensed seed by triggering the camera to capture the image while the field of view is illuminated by the flash light source.

5. The system of claim 1, wherein the seed planting machine is a crop row planter configured to dispense seeds in a row as the crop row planter moves across a field surface, wherein the camera is coupled to the crop row planter and position with a field of view that is fixed relative to the crop row planter, and wherein the electronic controller is further configured to output the image of the dispensed seed to a display screen, wherein the image of the dispensed seed that is output to the display screen is overlaid with a scale indicating a depth of a trench in which the seed has been placed.

6. The system of claim 1, wherein the electronic processor is configured to analyze one or more images of the dispensed seed to determine at least one planting variable selected from a group consisting of a depth of a trench in which the seed is placed, a width of the trench, and a spacing distance between adjacent seeds placed in the trench by the crop row planter.

7. The system of claim 1, wherein the electronic processor is configured to store the seed image of the dispensed seed to a non-transitory computer readable memory as documentation of a planting process.

8. The system of claim 1, wherein the electronic controller is further configured to:

trigger the camera to capture a series of seed images of the same dispensed seed in response to detecting, based on the analysis of the sequence of images that the seed has been dispensed by the seed planting machine, wherein the series of seed images are each higher resolution images than the images of the sequence of images, and output the series of seed images to a display screen for sequential display to demonstrate movement of the same dispensed seed in the trench.

9. The system of claim 1, wherein the electronic controller is further configured to output a series of seed images to a display screen for sequential display, wherein the series of seed images includes a seed image of each of a plurality of different individual seeds dispensed by the seed planting machine, and wherein sequentially displaying the series of seed images on the display screen demonstrates variations in seed placement.

10. The system of claim 1, further comprising:

the camera coupled to the seed planting machine and positioned with a first camera field of view including a portion of the field surface; and a second camera coupled to the seed planting machine and positioned with a second camera field of view that at least partially overlaps with the first camera field of view, wherein the electronic controller is configured to receive the sequence of images by receiving the sequence of images captured by the second camera.

11. The system of claim 1, wherein the electronic controller is configured to receive the sequence of images by receiving the sequence of images captured by the camera, and wherein the electronic controller is configured to trigger the camera to capture the seed image by triggering the camera to capture a higher resolution image.

12. A system for automatically capturing visual data of a seed placed by a seed planting machine, the system comprising:

a camera coupled to the seed planting machine and positioned with a field of view that includes a portion of a field surface; and an electronic controller configured to receive a signal indicative of a seed being dispensed by the seed planting machine, wherein the electronic controller is configured to receive the signal indicative of the seed being dispensed by the seed planting machine by receiving a sequence of images captured by the camera, and analyzing each image in the sequence of images to determine whether a seed is present in the image; and trigger the camera to capture an image of the dispensed seed in response to a determination, based on the signal, that the seed has been dispensed by the seed planting machine, wherein the electronic controller is configured to trigger the camera to capture the image of the dispensed seed in response to the determination by triggering the camera to capture the image of the seed in response to detecting an image in the sequence of images where the seed is present in the image.

13. The system of claim 12, wherein the image of the dispensed seed captured by the camera in response to the trigger is of a higher resolution than the images of the sequence of images.

14. The system of claim 12, further comprising a flash light source configured to illuminate the field of view of the camera, wherein the electronic controller is further configured to activate the flash light source in response to detecting an image in the sequence of images where the seed is present in the image, and wherein the electronic controller is configured to trigger the camera to capture the image of the dispensed seed while the field of view is illuminated by the flash light source.

15. A system for automatically capturing visual data of a seed placed by a seed planting machine, the system comprising:
- a camera coupled to the seed planting machine and positioned with a first camera field of view that includes a portion of a field surface;
- a second camera coupled to the seed planting machine and positioned with a second camera field of view that at least partially overlaps with the first camera field of view; and
- an electronic controller configured to
  - receive a signal indicative of a seed being dispensed by the seed planting machine, wherein the electronic controller is configured to receive the signal indicative of the seed being dispensed by the seed planting machine by receiving a sequence of images captured by the second camera, and analyzing each image in the sequence of images to determine whether a seed is present in the image, and
  - trigger the camera to capture an image of the dispensed seed in response to a determination, based on the signal, that the seed has been dispensed by the seed planting machine, wherein the electronic controller is configured to trigger the camera to capture the image of the dispensed seed by triggering the camera to capture the image of the seed in response to detecting an image in the sequence of images captured by the second camera where the seed is present in the image.

* * * * *